United States Patent [19]

Kaplan

[11] Patent Number: 6,069,921
[45] Date of Patent: May 30, 2000

[54] SYSTEM AND METHOD FOR REDUCING QUANTIZATION NOISE

[75] Inventor: Alan Edward Kaplan, Morris Township, Morris County, N.J.

[73] Assignee: AT&T Corporation, New York, N.Y.

[21] Appl. No.: 08/943,154

[22] Filed: Oct. 3, 1997

[51] Int. Cl.[7] .................................................. H04L 27/06
[52] U.S. Cl. ............................................ 375/243; 375/254
[58] Field of Search ....................................... 375/243, 254

[56] References Cited

U.S. PATENT DOCUMENTS

| | | | |
|---|---|---|---|
| 4,123,709 | 10/1979 | Dodds et al. .......................... | 375/249 |
| 5,050,474 | 9/1991 | Ogawa et al. ......................... | 375/254 |
| 5,204,879 | 4/1993 | McConnell . | |
| 5,394,437 | 2/1995 | Ayanoglu et al. ..................... | 375/222 |
| 5,406,583 | 4/1995 | Dagdeviren . | |
| 5,557,672 | 9/1996 | Perry et al. . | |
| 5,875,229 | 2/1999 | Eyuboglu et al. ..................... | 375/216 |

FOREIGN PATENT DOCUMENTS

| | | |
|---|---|---|
| 0 735 717 A2 | 10/1996 | European Pat. Off. . |
| WO 96/18261 | 6/1996 | WIPO . |

OTHER PUBLICATIONS

AT&T, *Telecommunications Transmission Engineering*, vol. 2, Facilities, pp. 532.

AT&T, *Telecommunications Transmission Engineering*, vol. 3, Networks and Services, Chapter 3, pp. 59.

McNees, G.K. "Transmission Performance of $\mu$=255 Quantization in a Local Digital Office," AT&T, *The Bell System Technical Journal*, vol. 59, No. 10; Dec. 1980, pp. 1943–1964.

Crue, C.R., et al., "D4 Channel Bank Family: The Channel Bank," AT&T *The Bell System Technical Journal*, Nov. 1982, pp. 2611–2664.

Adams, R.L., et al., "D4 Channel Bank Family: Thin–Film Dual Active Filters for Pulse Code Modulation Systems," AT&T, *The Bell System Technical Journal*, Nov. 1982, pp. 2815–2838.

*Primary Examiner*—Stephen Chin
*Assistant Examiner*—Kevin M. Burd
*Attorney, Agent, or Firm*—Oliff & Berridge, PLC

[57] ABSTRACT

A system and method for reducing quantizing noise is presented. In some Internet access and other dial-up services, modems or other sources connect into analog switching systems, and then are A/D-converted to reach remote switching offices. There, the digitized signal is converted back to analog, only to be re-digitized for T1 transmission. In the invention, the sample points used to re-digitize the signal are synchronized with those used to originally sample the signal, nearly eliminating second quantization noise.

25 Claims, 4 Drawing Sheets

SYSTEM AND METHOD FOR REDUCING QUANTIZATION NOISE

BACKGROUND OF THE INVENTION

1. Field of Invention

The invention relates to signal processing, and more particularly to reduction of the quanitzation noise that is introduced in dial-up communication systems that perform multiple quantizations of analog signals.

2. Description of Related Art

Communication devices such as private branch exchanges (PBXs), automatic call distributors (ACDs) and modem banks are often connected to their local telephone offices by digital carrier systems, most commonly T1 lines. If the devices are connected to analog switches, such as the still-common commercial 1ESS, then calls between other telephone offices (that are connected to the local office by digital carriers) and the above mentioned devices must have their signals converted from digital to analog and back to digital again, to ensure compatible connection. Such signals are said to be double quantized.

However, that chain of processing raises the problem that if no other compensation is done, these signals have a signal to noise ratio approximately 3 db worse than signals that are digitized only once (single quantized). The extra, second quantization noise doesn't cause severe problems for voice signals (although degradation occurs), but often causes 28.8 Kbps and faster modems to have to fall back to a lower data rate.

SUMMARY OF THE INVENTION

The invention accordingly relates to a system and method for reducing quantization noise associated with multiple A/D conversions that overcomes these and other problems of the art. The invention uses a novel channel bank configuration including a type of digital channel bank that does the second quantization with the same clock phase (and frequency, of course) as the first upstream quantization. The system and method of the invention causes essentially no additional quantizing noise, unlike conventional channel banks.

DETAILED DESCRIPTION OF PREFERRED EMBODIMENTS

A. Network Environment in which the Invention Operates

Figure 1:
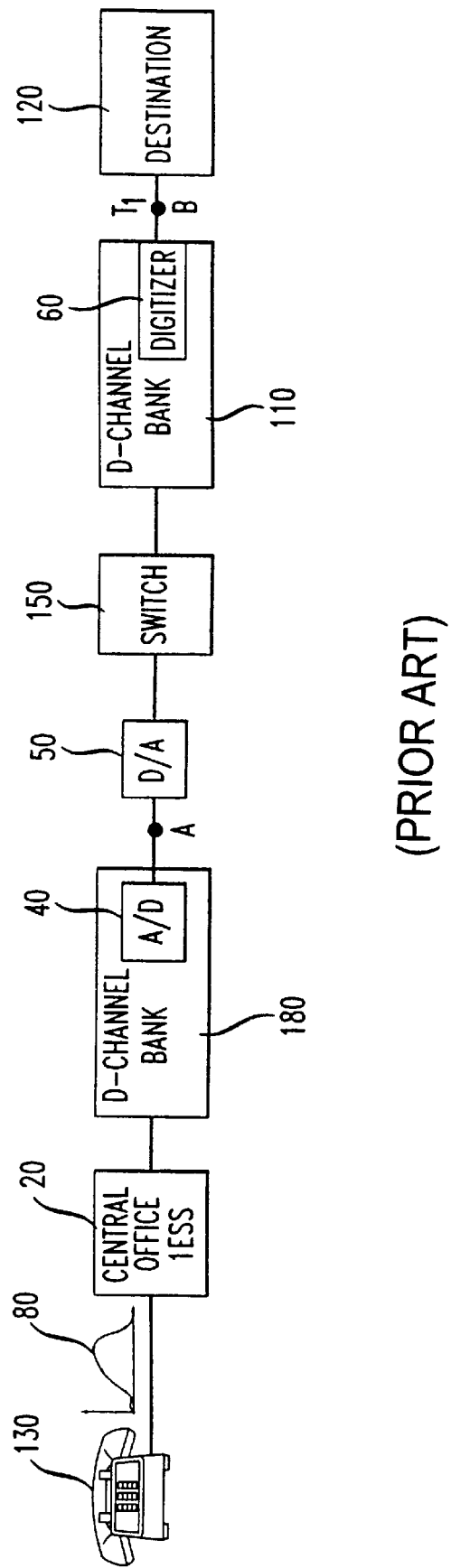
FIG. 1 illustrates a conventional end-to-end dial-up communication network.
Figure 2:
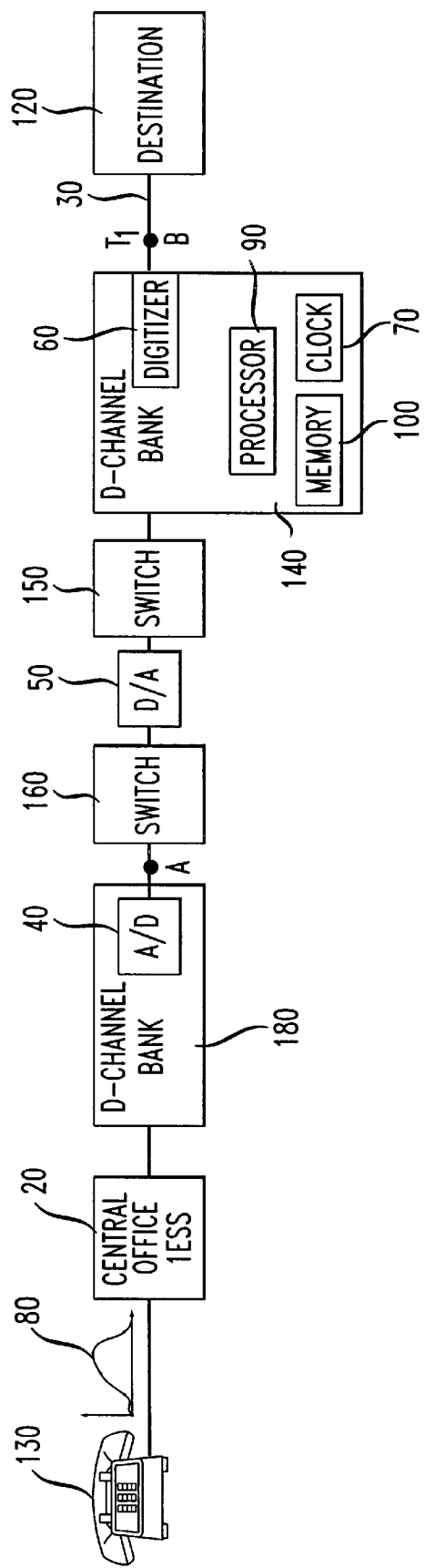
FIG. 2 illustrates an end-to-end dial-up communication network employing the invention.

In terms of the network environment in which the invention operates, PBXs, ACDs, modem banks and other devices are frequently connected to their serving central telephone offices (or switch) 150 by means of a digital carrier system 30. Typically these are T1 systems, though very large installations may use T3 systems. If an originating device 130 such as a telephone, or modem, is served by a serving central office 20 which is an analog office such as a 1ESS office, then the analog line side circuits are connected to the digital carrier system 40 where they are digitized and combined into a single outgoing data stream. If calls to such destinations originate in an office other than their (analog) serving office, they nearly always are digitized and sent over carrier systems to the trunk side of the analog office. (The transmission path is discussed in terms of a left to right direction in FIG. 2, but it will be understood that transmission in the opposite direction is also contemplated).

As noted, this causes each originating signal 80 to be quantized twice, once at first digitizer 40 (which may be embedded in a conventional D channel bank, 180 and once at second digitizer 60 (which may be embedded in conventional D channel bank, 110). That, in general, doubles the quantizing noise, as understood be persons skilled in the art. The doubled quantizing noise lowers perceptible voice quality slightly, but ordinary telephone users are not likely to notice or be concerned. However, double quantization noise often reduces signal quality enough so that high speed modems are forced to revert to a lower speed. By way of broader motivation, these problems occur not only in places where modem banks are connected to line side T1 channel banks, but also in cases where a nonintegrated SLC (subscriber loop carrier) systems are used to carry modem traffic. Voice quality also deteriorates, but as noted a 3 db loss isn't practically significant. PBXs connected via Tl lines to an analog office have the same problem.

B. Noise Characteristics of Environment in Which the Invention Operates

Mu-Law pulse code modulation (PCM) uses a floating point number with a sign bit, a 3 bit exponent and a 4 bit fraction to represent signal levels. Thus, high level signals are quantized more coarsely than low level signals. (One can alternatively think of this as linearly quantizing the logarithmically companded signal.) This property of Mu-law PCM (and A Law as well) means that the signal to noise ratio is approximately constant as a function of signal level, and that the higher level signals contribute nearly all the quantizing noise. (See Transmission Performance of $\mu$=255 Quantization In a Local Digital Office, G. K. McNess, Bell Technical System Journal, December 1980 Vol. 59, No. 10, pp. 1943–1964, incorporated by reference). Data signals tend to be of a much higher level than voice signals. They typically have levels on the order of −16 dbm.

For high level signals a conventional D4 channel bank produces a signal to noise ratio of approximately 39 db, as known in the art. If the reconstructed analog signal (converted to analog by intermediate D/A converter 50 (one side of a D channel bank) and switched by following switch 150) is resampled with a clock that is randomly phased with respect to the clock with which the signal was originally sampled, the same quantizing noise can be expected to be produced, again. This results in a signal to noise ratio that is 3 db worse than the original, that is, 36 db.

A typical analog line produces a constant average noise level. The average value in one published empirical survey was −7 dbrnC=−97 dbmC. (C is for C message weighting that multiplies the signal by a frequency dependent weighting function that is 0 db at 1,000 Hertz and falls to about −10 db near the edges of the voice band). Given an original signal with signal to noise ratio of 39 db and a signal level of −10 dbm, adding in a noise level of −97 dbmC changes the overall signal to noise ratio by less that 0.01 db. This analysis only counts metallic noise. Cross talk must also be considered, but as known in the art, it is normally much smaller than the metallic noise and can be ignored to a first, but good, approximation. (See for example Telecommunications Transmission Engineering, Volume 3, Networks and Services, Second Edition, Copyright AT&T, 1977, page 59, incorporated by reference.) Further, this ignores the cross talk that occurs in the quantizing filter. This cross talk is at a much higher level than that in the typical loop, as understood by persons skilled in the art.

Thus the signal to noise ratio is more than 2.99 db worse for a second, randomly phased quantization than it is for using a typical analog loop after converting back to analog. For modems that are pushing the envelope of the capacity of a voice grade channel to accurately deliver data, this much signal to noise penalty will likely result in a speed backoff (for instance, to 26.4 kbs for a 28.8 kbs modem). Note that if the clocks of both quantizers (40 and 60) are synchronized in frequency, then if they are accidentally in phase, or nearly in phase (with respect to the analog signal they see), the noise penalty for the second quantization is substantially less than 3 db. Thus a small number of the lines are likely to suffer only a small noise penalty. (This ignores signals near the edge of the band where the reconstruction filter's phase non-linearity causes the second quantizing to produce extra noise.)

C. First Illustrative Embodiment of Invention

In the practice of the invention, it is to be noted that all of the T carrier used for switch telephony is essentially master clocked, since all frequencies are derived from rubidium atomic clocks that are phase-locked to GPS (Global Positioning System) receivers. These primary standards maintain long term (24 hour) frequency to better than 1 part in $10^{13}$. Thus it can be assumed that all T carriers run at essentially the same frequency, and differ only in their receiver phase. (This is necessary, for instance, to make the commercial 4ESS switching system work.)

It is also to be noted that the reconstruction filter used for a T1 line provides essentially a proper interpolator of the sample points. (This isn't precisely true near the edges of the passband since the filter doesn't maintain linear-phase close to the edges of the band, introducing a time distortion. Since most of the energy is away from the edges, this issue may be practically ignored). One could always work with a filtered sample that is linear phase. That is, a filter can be added that has unity gain and that, when combined with the original reconstruction filter, produces equal delay for all frequencies in the passband.

Also, if may be noted that PCM (Mu-law) has precisely defined digital levels (in terms of a reference voltage). First the case where there is no robbed bit signaling, is considered. Robbed bit signaling is considered later. Note that a small range of voltages need to be considered, as well as times when the sequence of sample times is calculated. This is because if a sample is at (or very near) an extremum (a local minimum or maximum) then the exact signal level of PCM code may not be reached.

Figure 3:
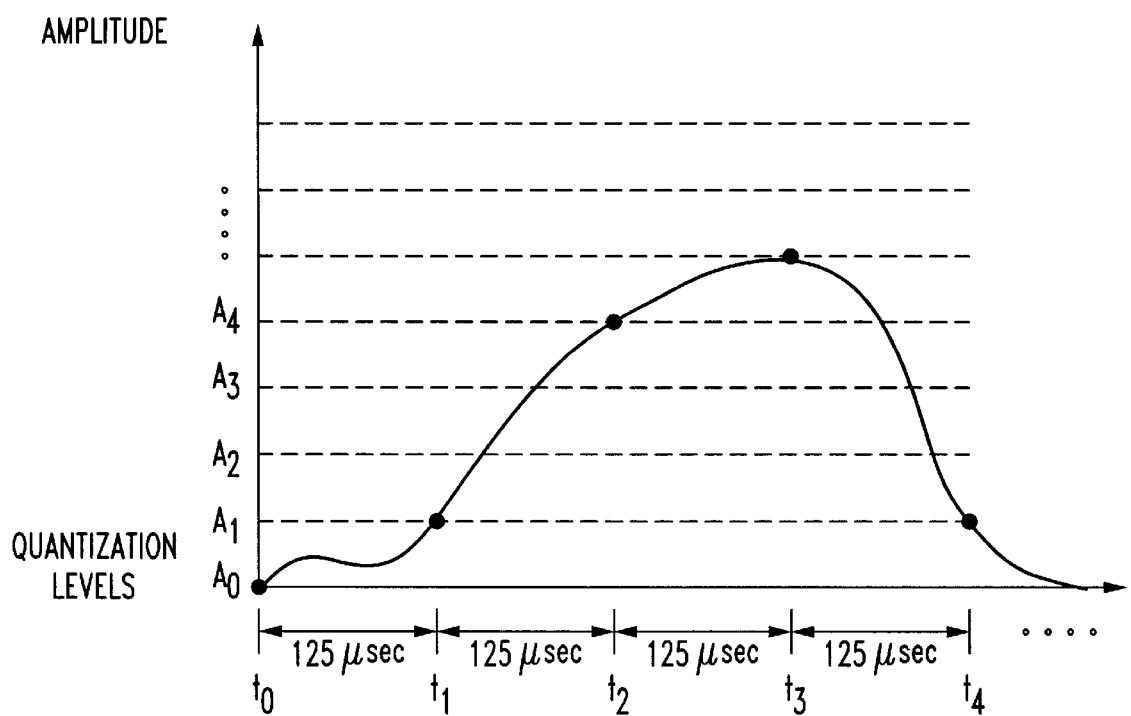
FIG. 3 illustrates the sample point searching action of the system and method of the invention.

The following discussion assumes the gain of the reconstruction filter and the wire that follows it are exactly one. If not doing the obvious scaling fixes, the problem provided the gain is flat over the band of interest. (For D3 and D4 channel banks the gain is flat within 0.16 and 0.12 db, respectively. See for instance, D4 Channel Bank Family: The Channel Bank, C. R. Crue, W. B. Gaunt, Jr., J. H. Green, J. E. Landry and D. A. Spires, Bell System Technical Journal, November, 1982, pp 2611–2664; and D4 Channel Bank Family: Thin-Film Dual Active Filters for Pulse Code Modulation Systems, R. L. Adams, J. S. Fischer, O. G. Peterson, and I. G. Post, Bell System Technical Journal, November 1982 2815–38 (each incorporated by reference)). See FIG. 3.

What follows is an explanation of a first illustrative embodiment of the system and method of the invention that for the linear phase, unity gain case, reconstructs a very good approximation of the original sampling points and levels. Thus almost no quantizing noise beyond the irreducible minimum provided by the original quantization is introduced. (Here again a left to right transmission path is illustratively discussed, but the reverse direction is also contemplated).

First, a high frequency (for instance 1000×8,000 Hz) clock 70 located in channel bank 140 of the invention is phase-locked to the network 8000 Hz clock. The originating analog signal coming from D/A 50 is switched by switch 150, then sampled at the higher rate with an accurate first A/D converter 60 (at least 14 bits), contained in channel bank 140. All the sample points sampled in this fashion are stored in a circular buffer, which may be formed in memory 100, which may be high speed static RAM or other electronic or other memory. The sample points at which the signal is approximately equal to a Mu-law quantization level ($A_0, A_1, A_2 \ldots$) are then searched for. That is, the samples for which this is the case are copied from original storage in memory 100 to another place in that memory, or to separate RAM. The selection is done only for fairly high quantization levels. These selected discrete time points are then searched for a sequence whose sample times are approximately integer multiples of 125 microseconds apart. A smoothed sample of these times (interpolating where no samples were taken due to small signal levels) generates a sample clock that approximates the original clock with which the originating analog signal 80 was sampled. In practice the 8,000,000 Hz clock is preferably divided down to an 8,000 Hz clock, such that a rising edge of the 8,000 Hz clock is coincident with the sample times.

Actually, establishing the timing points is slightly more complicated than this. Some points not at the original properly phased sample times will also have values that look like exact quantized levels. What is needed, and what the first illustrative embodiment performs, is a search using embedded processor 90 for a series of points that are at proper quantized levels (to the accuracy of the A/D converter 60) and are approximately multiples of 125 microseconds apart. (The approximation of times should be quite good if only relatively high levels are looked at where the quantizing is coarse.) For certain signals (a pure sine wave at an exact submultiple of the sampling rate, 2 KHz for an example) there may not be a unique solution of 125 $\mu$s spaced samples that are at a quantizing level. This is acceptable, since any solution will not add to quantizing noise. For actual signals used in practice, a unique sampling solution is virtually certain.

In summary, in the first illustrative embodiment processor 90 searches through a sample pool for a series of points that have values approximately equal to a quantizer output value $A_0, A_1, A_2 \ldots$ and are multiples of 125 microseconds apart (probably between 124 and 126 microseconds in practice; see Transmission Performance of $\mu$=255 Quantization In a Local Digital Office, G. K. McNess, Bell Technical System Journal, December 1980 Vol. 59, No. 10, pp. 1943–1964). If such a series of points are found and it is sufficiently long, it can be reasonably inferred that the invention has locked onto the correct sample points. In other words, the statistical likelihood that a series of data points, for example 128 or 256 points, would be aligned both at properly phased 125 microsecond intervals and at proper Mu-law quantizing levels, and not represent valid sample points, is insignificant. If it is found that after trying at most a few other points at multiples of 125 microseconds that they are not at exact quantized values, then processor 90 begins a search for the next match of quantized values. Then the search for later matches is started again, until lock-on is achieved.

The sample point search is actually carried out using samples stored in memory 100 such as RAM, rather than by looking at entirely new samples. The sample point search is just for a correct phase. One could build implementations as parallel as desired to do these searches, provided that access to memory 100 is fast enough. An 8K×14 bit memory is enough for a millisecond of samples. This is currently easily built as fast static RAM on a custom chip. (Or quite slow static RAM if only one state machine wants to read it.) As noted, the memory 100 in this case is organized as a circular buffer.

Points in the 125 microsecond sample sequence that are at multiples that do not match with the high levels being checked must have levels that are smaller, in absolute value, than the checking range. Otherwise the resulting time sequence is not valid.

Alternatively to sampling and recording all possible sample points sampled at high speed to form a complete candidate pool, in the implementation of the invention a filtering process could be applied. In this implementation, sample value and time-stamp (absolute but not necessarily equal intervals of time) information is stored as a pair, only for samples whose amplitudes are at or near proper quantizing levels. Then, all sample values at all times need not be checked, but only the abbreviated sequence need be examined, for samples with proper quantizing levels, with allowance for near-range checking.

The system and method of the invention needs to continue to check samples to make sure there isn't a false frame, and to perform slight phase adjustments to compensate for any temperature dependent reconstruction filter delays.

Since gain errors (amplitude, not phase) leave the average (smoothed) position of clock 70 unchanged even though they change the position of the original sample points, it is possible, by measuring high level signals at the smoothed sample points, to compensate for the gain errors provided that the error is small enough to fall within a quantizing interval. Since the quantizing interval is quite large for high level signals gain errors of up to about 1.6% may be compensated for. (The errors noted are the "unknown" gain errors. Any filter or line gain (loss) that are known ahead of time can be compensated for initially.)

D. Second Illustrative Embodiment of the Invention

In the first illustrative embodiment the invention was assumed to sample at 8,000,000 samples per second and could, in principle, be made to do parallel searches for correctly quantized levels approximately 125 microseconds apart. It would also be possible to employ a simpler implementation that uses, for example, a 1,000,000 Hz clock and sample only at 8,000 Hz intervals. In this second illustrative embodiment, the invention starts at a point where a sampled level is at Mu-law level, and checks a sequence of samples at 125 microsecond intervals. This embodiment in general operates similarly to the first illustrative embodiment above, except that it is serial. Processor 90 in the second illustrative embodiment actually does the serial search described in the previous embodiment serially in time, rather than looking through memory 100 containing stored samples as in the fist illustrative embodiment.

Note that in the foregoing it is assumed that there are high level samples. This will always be the case for modems, where the second quantizing noise presents a substantial problem. For voice one cannot count on high level signals, but quantizing noise is less of a problem both because for low level signals second quantization doesn't offer as big a penalty as for high level signals, and because human hearing is more tolerant of a slight decrease in signal to noise ratio than modems.

Another set of practical considerations for implementation of the invention relate to differences among the channel banks 20 that do the first conversion to analog (Point A, D/A 50). One preferably should understand how closely controlled the reference voltages (and thus quantizing levels) of those banks are, for greatest accuracy. Another tolerance consideration concerns the nonlinear phase of the reconstruction filters of the channel banks 110, near the edges of the voice band. The filters of various generations of channel banks have different circuit designs. More modern generations of commercially available Lucent Technologies channel banks use laser trimmed resistors, and have small unit to unit variation within a family. A practical adjustment for such variances is to compensate the delay variation (as a function of frequency) for the D4 channel bank only. Since there is much more energy in the linear phase part of the band, the difference in compensation among bank families should not matter much unless they have opposite signs. Empirical evidence of this is that a small percentage of doubly quantized modem signals (presumably with close clock phases on both quantizers) work at maximum speed without any delay equalization. If in the implementation of the invention newly adapted channel banks are built, linear phase D/A converters can be incorporated from the start.

There is also the practical consideration of how fast the invention needs to synchronize relative to the training time of the originating source 130, such as modems, in question. With the first illustrative embodiment of the invention the quantizing points $t_o, t_1, \ldots$ should be found in just a few tens of milliseconds. This is much shorter than any likely modem training time, and therefore presumably acceptable. In the second illustrative embodiment, the synchronization time could be a substantial fraction of a second. This is a disadvantage in that it is less acceptable, but empirical data can determine the maximum acceptable time, and parameters adjusted accordingly. It may also be possible to digitally delay the signal, and thus stretch the time during which this embodiment of the invention can be locking on the signal. Delay is removed during actual operation.

It should also be noted that in order to make the invention perform optimally, unless special routing is done, all of the channel banks in the analog offices affected need to be replaced. That is, not only the channel banks connected directly to the modem pools need to be replaced, but also the channel banks to other central offices since the double quantization occurs in both transmission directions.

In the implementation of the invention, either all channel banks can be adapted to the inventive scheme, or only a specially selected subset. The latter case offers a less costly, though slightly more complex, alternative to replacing all of the channel banks in the implementation of the invention. Calls placed to particular numbers that are double quantized can be routed through special trunks that terminate at the analog office in the type of channel bank this application describes. The simplest way to do this is to be sure that these numbers are in their own exchange (NNX), since routing decisions are standardly based on exchange. The possibility that signals that are not double quantized will go through a channel bank that eliminates the double quantizing error isn't a problem, except that the channel bank won't be able to synchronize to a set of previous quantizing times. It should be to recognized this lack of synchronization in a reasonable time furnishes proof that there was no previous quantization, and in this embodiment processor 90 consequently just chooses an arbitrary clock phase to quantize the signal. An example would be if a telephone 130 happens to be directly connected to switch 150.

E. Third Illustrative Embodiment of the Invention

If the invention is implemented in an environment using a digitized channel using robbed bit signaling (See Telecommunications Engineering, Vol. 2 p. 532, incorporated by reference) then that signaling contributes extra quantizing noise (See Transmission Performance of $\mu$=255 Quantization In a Local Digital Office, G. K. McNess, Bell Technical System Journal, December 1980 Vol. 59, No. 10, pp. 1943–1964) of about 1.8 dB. It is possible, if analog levels are known, to determine the time of the robbed bit signals. If each frame is buffered so that the robbed bit signaling sample time of all the inputs are aligned and put in the robbed bit sampling time of the output frame, then no additional noise is introduced associate with robbed bit signaling, which would be the case if the alignment were not made. (Separate bits in general would be robbed if the alignment were not made).

The approach in this regard is similar to finding the regular sample times, except that the levels for robbed bit time are as if the bits were ½ and are thus half way between ordinary sample levels. The robbed bit frames are expected to be 750 msec (6×125 apart). In this environment, the invention looks for signals either at standard or robbed bit values, and finds a sequence of regular value multiples at 125 msec apart, except that these occur 5 times in a row with the values at the sixth sample at robbed bit levels. The digital samples are then buffered and robbed bit times found, and then when assembling T1 frames these are aligned with the robbed bit times in the frames.

F. Fourth Illustrative Embodiment of the Invention

Figure 4A:
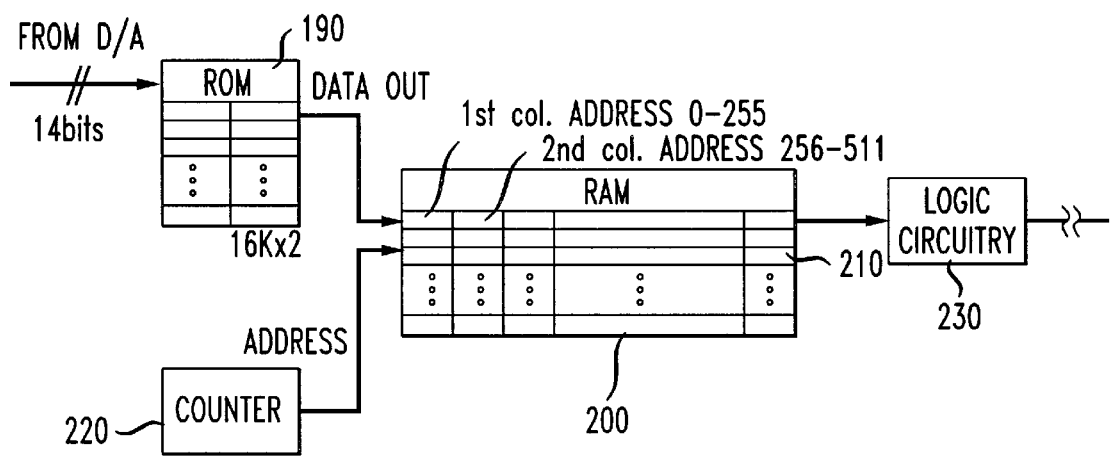
FIGS. 4(*a*) and 4(*b*) illustrates an electronic memory structure that used in an embodiment of the invention.

Attention is now directed to the non-robbed bit signaling case, and implementation of the system and method of the invention to avoid double quantizing errors in a custom integrated electronic circuit. (The robbed bit case can be analogously implemented, and description of that implementation is omitted). As illustrated in FIG. 4(a), the circuit is divided into two parts, the first of which is a standard read-only memory 190 (ROM) that is 16 K ($2^{14}$) long, and 2 bits wide. Using the 14 bit output of A/D converter 70 as address lines, values of the 16 K locations in the ROM 190 are used to indicate whether a sample value is at (or sufficiently near) a permissible quantizing level, and whether the sample value is above a predetermined threshold. That is, each value for the D/A is used as an address (index) into the ROM 190 at which address is stored a value that indicates whether the current value is in close proximity to a permissible quantizing level, and whether it is in a predetermined high or low margin (above or below that level).

Figure 4B:
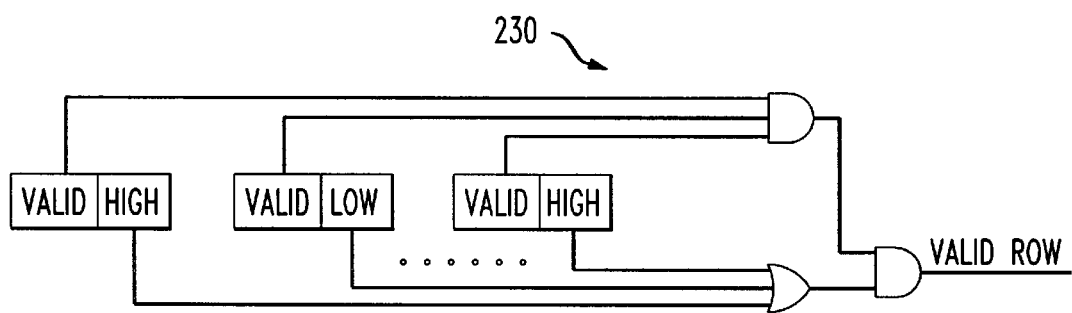

The second circuit is a specialized random access memory 200 that stores sample values coming out of the ROM 190. That is, memory 200 stores the two bit encoded values. In addition, the RAM 200 contains or has associated with it logic circuitry 230 (FIG. 4(b)) that indicates that an entire row of 210 values are within a proper range (using AND logic), and that at least some selected number of them are above the predetermined threshold. (FIG. 4(b) illustrates the case of accepting a single value, using OR logic). The approach is to arrange the rows of the RAM 200 so that consecutive elements of the row represent samples that are 125 microseconds apart. Thus if rows are long enough for statistically sufficient verification, a row all of whose values are at (or near to) a permissible quantizing level ($A_0$, $A_1$, etc.) will indicate which clock phase is the proper one for second digitization (resampling). The consecutive locations of RAM 200 are written (mod size) using a counter 220 whose least significant bits (8 for a 256 multiplier, 10 for a 1 K multiplier) indicate a clock phase of the 256 (or 1 K)×8,000 Hz clock.

Note that in order to use standard memory decoding hardware, the sample frequency used must be a power of 2 (i.e., $2^n$) the 8,000 Hz sample rate in this embodiment. 256, 512 or 1024 times the 8,000 Hz rate are reasonable values to chose. If more than a single row 210 of RAM 200 qualifies as valid, the choice of the middle row can be used to break "ties", though these are unlikely unless the range of acceptable quantized values is chosen to be large.

FIG. 4(b) illustrates the case of accepting a single high value (minimum) as being acceptable and generating a "valid row" output. The logic circuitry 230 could be made to require a plurality of high values. However, many of the threshold totals that could be selected to trigger a "valid row" output would require an appreciable amount of combinatorial circuitry registering a running total of high bits. Consequently, implementing a threshold of two or more high values would preferably be done with sequential logic. That logic could for instance include an up-down counter coupled to a comparator to compare the count of that counter to a preset value associated with each row 210 of memory 200, encoding a logical validity indicator as values are entered into the row. In such an implementation, a reset mechanism must be provided to reset the counter, as understood by persons skilled in the art. On the first pass through memory after reset, the values in the memory are treated as effectively low.

Alternatively, to implement a plurality "high" trigger an analog circuit configured to determine the approximate number of high values encountered above the selected threshold could be used. Illustratively, a voltage divider and comparator arrangement using parallel resistors which are each connected to a pass transistor could be used. That circuit would provide a short to ground when the pass transistor is activated by a high value, with a pull-up resistor connected to a positive voltage rail, so that the resulting cumulative voltage indicates the approximate number of high values, which is compared to a voltage representing the threshold.

The row 210 of memory 200 which is valid is preferably connected to an encoder 230 to keep the number of output pins smaller. That is, to select one of 256 rows one needs only eight output pins, rather than 256, using such an encoder.

The foregoing description of the invention is illustrative, and variations in construction and implementation will occur to persons skilled in the art. The scope of the invention is intended to be limited only by the following claims.

What is claimed is:

1. A sampling method for synchronizing a first digital channel bank and a second digital channel bank connected by an analog network, comprising the steps of:

receiving a reconstructed analog signal produced by the first digital channel bank representing an original analog signal;

searching the reconstructed analog signal for the presence of a candidate sample point occurring at a permissible quantization level employed in a first digitization of the original analog signal; and re-digitizing the reconstructed analog signal at the second digital channel bank to produce a second-digitized signal, when the candidate sample point coincides with a sample time period of the first digitization.

2. The method of claim 1, wherein the original analog signal is a voice or modem signal transmitted over a telephone line.

3. The method of claim 1, further comprising the steps of:

storing a plurality of candidate sample points in memory, and producing a second-digitized signal, for each of the sample points stored.

4. The method of claim 3, wherein the step of searching comprises the step of determining the amplitude of the reconstructed analog signal by iterative sampling with a resolution of at least that used in the first digitization.

5. The method of claim 4, wherein the first digitization and the second digitization are done according to Mu-law, A-law or linear PCM technique.

6. The method of claim 5, wherein the step of searching comprises the step of searching a plurality of sample points for a match with permissible quantization levels of the first digitization, in parallel.

7. A sampling method for synchronizing a first digital channel bank and a second digital channel bank connected by an analog network, comprising the steps of:

receiving a reconstructed analog signal produced by the first digital channel bank representing an original analog signal;

determining permissible quantization levels employed in a first digitization of the original analog signal;

determining periodic sample values of the reconstructed analog signal at a sample time period of the first digitization;

re-digitizing the reconstructed analog signal at the second digital channel bank to produce a second-digitized signal, when the periodic sample values match permissible the quantization levels employed in the first digitization.

8. The method of claim 7, wherein the original analog signal is a voice or modem signal transmitted over a telephone line.

9. The method of claim 7, further comprising the steps of storing a plurality of candidate sample points in memory, and producing a second-digitized signal, for each of the sample points stored.

10. The method of claim 9, wherein the step of searching comprises the step of determining the amplitude of the reconstructed analog signal by iterative sampling with a resolution of at least that used in the first digitization.

11. The method of claim 10, wherein the first digitization and the second digitization are done according to one of Mu-law, A-law and linear PCM technique.

12. A sampling apparatus for synchronizing a first digital channel bank and a second digital channel bank connected by an analog network, comprising:

an input circuit to receive a reconstructed analog signal produced by the first digital channel bank;

a processing unit, the processing unit being configured to search the reconstructed analog signal for the presence of a candidate sample point occurring at a permissible quantization level employed in a first digitization of the reconstructed analog signal; and a converter unit, to re-digitize the reconstructed analog signal at the second digital channel bank to produce a second-digitized signal, when the processor unit detects that the candidate sample point coincides with the permissible quantization level.

13. The apparatus of claim 12, wherein the original analog signal is a voice or modem signal transmitted over a telephone line.

14. The apparatus of claim 12, further comprising a memory to store a plurality of candidate sample points, and wherein the processor produces a second-digitized signal, for each of the sample points stored.

15. The apparatus of claim 14, wherein the processor unit determines the amplitude of the reconstructed analog signal by iterative sampling with a resolution of at least that used in the first digitization.

16. The apparatus of claim 15, wherein the first and the second digitization are done according to one of Mu-law, A-law and linear PCM technique.

17. The apparatus of claim 16, wherein the processor unit searches a plurality of sample points for a match with permissible quantization levels of the first digitization, in parallel.

18. A sampling method for synchronizing a first digital channel bank and a second digital channel bank connected by an analog network, comprising the steps of:

receiving a reconstructed analog signal produced by the first digital channel bank representing an original analog signal;

searching the reconstructed analog signal for the presence of a candidate sample point occurring at a first permissible quantization level employed in a first digitization of the original analog signal;

searching the reconstructed analog signal for the presence of a candidate sample point occurring at a second permissible quantizaion level employed in the first digitization of the analog signal; and re-digitizing the reconstructed analog signal at the second digital channel bank to produce a second-digitized signal, when the candidate sample point coincides with a sample time period of the first digitization.

19. The method of claim 18, further comprising the steps of:

storing a plurality of candidate sample points in memory, and producing a second-digitized signal, for each of the sample points stored.

20. The method of claim 19, wherein each step of searching comprises the step of determining the amplitude of the reconstructed analog signal by iterative sampling with a resolution of at least that used in the first digitization, using the first and second permissible quantization levels, respectively.

21. The method of claim 20, wherein the first digitization and the second digitization are done according to Mu-law, A-law or linear PCM technique.

22. The method of claim 20, wherein the second permissible quantization level is a robbed bit quantization level.

23. The method of claim 22, wherein the original analog signal is a voice or modem signal transmitted over a telephone line.

24. The method of claim 23, wherein the robbed bit quanitzation level occurs every sixth frame of a T1 transmission scheme.

25. The method of claim 24, further comprising the step of aligning a plurality of successive robbed bit frames in time.

* * * * *